Figure 1:
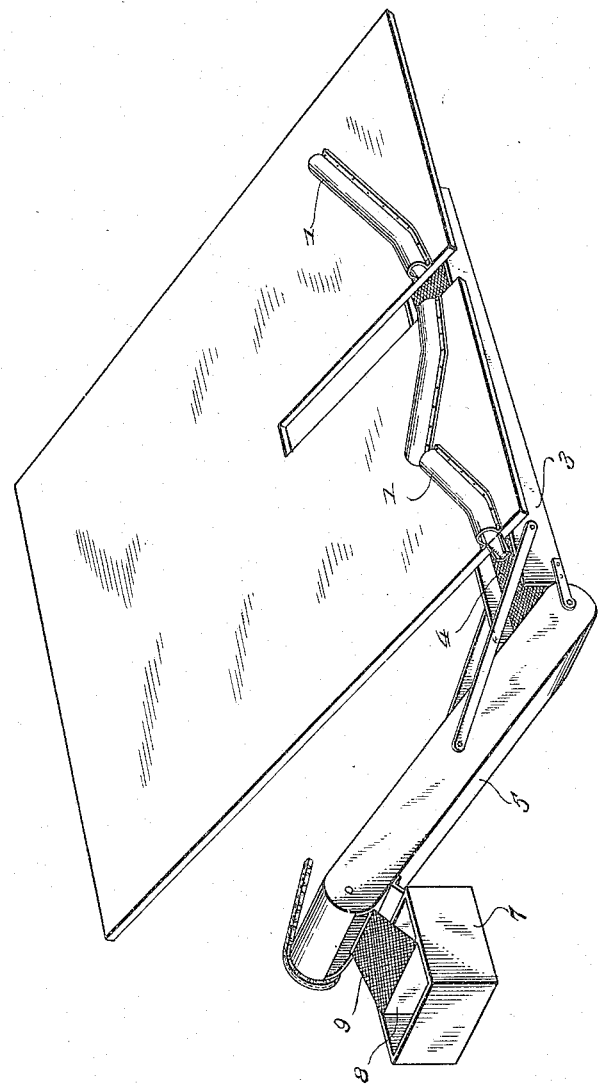

B. G. NELSON.
GRAIN SAVING DEVICE.
APPLICATION FILED MAY 27, 1914.

1,135,542.

Patented Apr. 13, 1915.
2 SHEETS—SHEET 1.

Inventor
B. G. Nelson,

Witnesses

By Victor J. Evans
Attorney

THE NORRIS PETERS CO., PHOTO-LITHO., WASHINGTON, D. C.

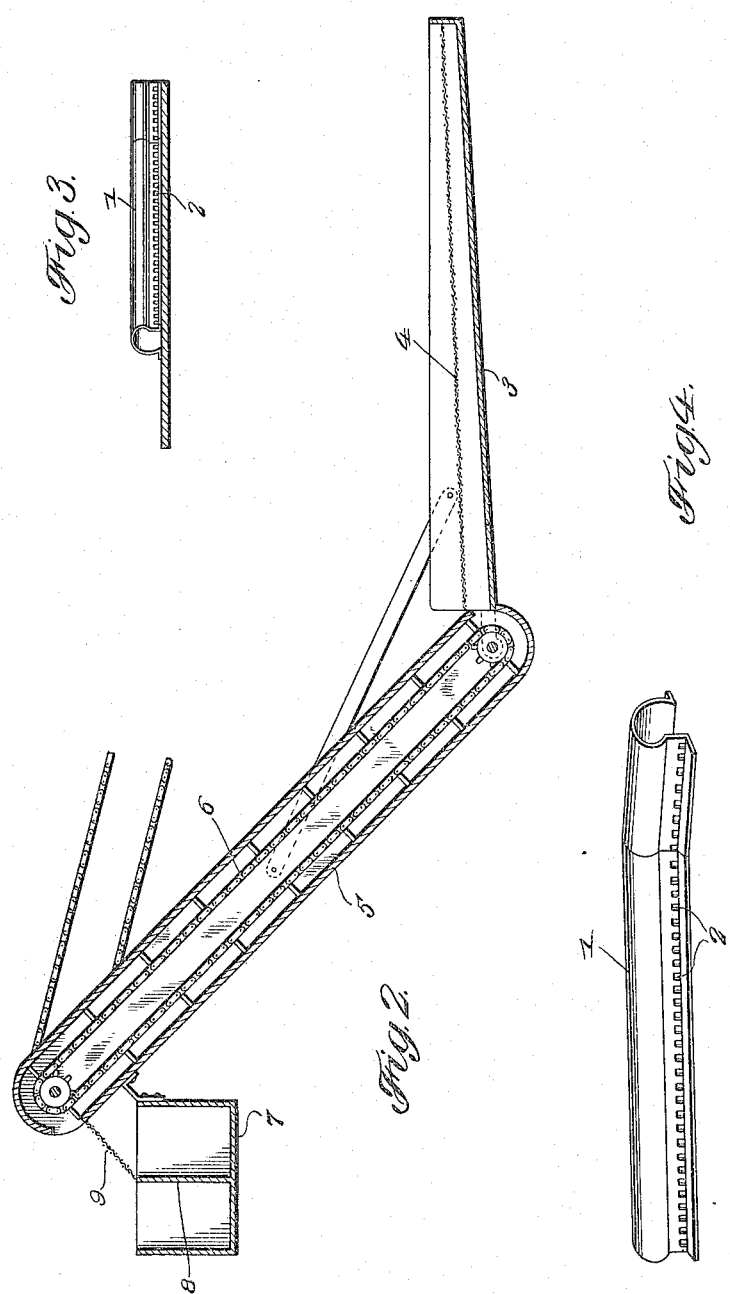

UNITED STATES PATENT OFFICE.

BRUCE G. NELSON, OF GRAND FORKS, NORTH DAKOTA.

GRAIN-SAVING DEVICE.

1,135,542.     Specification of Letters Patent.     Patented Apr. 13, 1915.

Application filed May 27, 1914. Serial No. 841,305.

*To all whom it may concern:*

Be it known that I, BRUCE G. NELSON, a citizen of the United States, residing at Grand Forks, in the county of Grand Forks and State of North Dakota, have invented new and useful Improvements in Grain-Saving Devices, of which the following is a specification.

This invention relates to grainsaving devices and it consists in the novel features hereinafter described and claimed.

An object of the invention is to provide a device of simple structure adapted to be applied to a harvester preferably at the grain deck thereof for the purpose of collecting and saving any grain which may be knocked from the heads during the time that the grain is being cut and bound by the harvester.

With the above object in view the device includes tubular members adapted to be applied to the grain deck of the harvester and which are provided with angularly disposed ends and openings at one side. The grain which is knocked from the heads passes through the said openings into the tubular members and is permitted to gravitate toward a chute provided at the edge of the grain deck. An elevator is pivotally connected with the chute and means is provided for operating the elevator from the moving parts of the harvester. The said elevator carries the grain up and deposits the same into a receptacle provided at the delivery end of the said elevator.

In the accompanying drawings:—Figure 1 is a perspective view showing the arrangement of the features of the device. Fig. 2 is a longitudinal sectional view of the device. Fig. 3 is a detailed view of a tube used on the device. Fig. 4 is a perspective view of said tube.

The device comprises tubular members 1 which are provided with angularly disposed end portions. The said tubular members are adapted to be secured to the upper surface of the grain deck of a harvester and the said members are provided at their uppermost sides with openings 2. A chute 3 is located under the grain deck of the harvester and the lower ends of the members 2 are located above the said chute so that the grain which enters the members 1 through the openings 2 thereof may gravitate through the tubular members into the chute 3. The chute 3 is provided with a detachable screen 4 upon which particles of straw and trash will lodge but the grain will pass through the screen 4 and run down along the bottom of the chute 3 through the delivery end thereof.

A trunk 5 is pivotally connected with the chute 3 at the delivery end thereof and is adapted to receive the grain from the chute. An elevator is mounted for movement in the trunk 5 and any suitable means may be provided for operating the elevator from the movable parts of the harvester.

A receptacle 7 is connected with the upper portion of the trunk 5 and is adapted to receive the grain from the elevator 6. The receptacle 7 is provided with a partition 8 which divides the said receptacle into compartments and a screen 9 leads from the delivery end of the trunk 5 to one of the compartments adjacent the partition 8. The larger particles of grain will pass along the screen 9 into one compartment in the receptacle 7 while the smaller grain will pass through the screen 9 and be deposited in another compartment in the receptacle 7. Therefore it will be seen that as the grain is saved it is separated into different kinds, the said kinds are received and held in separate compartments. At intervals the receptacle 7 may be emptied of its contents.

Having described the invention what is claimed is:—

1. In combination with an inclined deck, a grain saving device comprising a tubular member applied to the upper side of the deck near the lower edge thereof and provided at its upper side with openings.

2. In combination with an inclined deck, a grain saving device comprising a tubular member applied to the deck and upon the upper side thereof near the lower edge thereof said tubular member having angularly disposed end portions and being provided at its upper side with openings.

3. In combination with an inclined deck, a grain saving device comprising a tubular member applied to the upper side of the deck near the lower edge thereof, said tubular member being provided in its upper side with openings, a chute applied to the deck at the lower side thereof and adapted to receive grain from the tubular member, an elevator supported from the deck and leading from said chute and a receptacle located at the delivery end of the elevator.

4. In combination with an inclined deck, a grain saving device comprising a tubular member applied to the upper side of the deck near the lower edge thereof and provided at its upper side with openings, a chute applied to the lower side of the deck and adapted to receive grain from the tubular member, a detachable screen located in the chute, an elevator pivotally connected with the deck and arranged to receive grain from the chute, means for operating the elevator, a receptacle carried at the delivery end of the elevator and having a partition which divides the same into compartments and a screen leading from the elevator over one compartment and having its delivery end disposed above an adjacent compartment.

In testimony whereof I affix my signature in presence of two witnesses.

BRUCE G. NELSON.

Witnesses:
ROSINA R. MERRITT,
SADIE M. NELSON.

Copies of this patent may be obtained for five cents each, by addressing the "Commissioner of Patents, Washington, D. C."